United States Patent
Nanbu

(10) Patent No.: US 10,650,493 B2
(45) Date of Patent: May 12, 2020

(54) IMAGE PROCESSING APPARATUS

(71) Applicant: KYOCERA Document Solutions Inc., Osaka (JP)

(72) Inventor: Sota Nanbu, Osaka (JP)

(73) Assignee: Kyocera Document Solutions, Inc. (JP)

( * ) Notice: Subject to any disclaimer, the term of this patent is extended or adjusted under 35 U.S.C. 154(b) by 165 days.

(21) Appl. No.: 15/991,637

(22) Filed: May 29, 2018

(65) Prior Publication Data
US 2018/0350040 A1  Dec. 6, 2018

(30) Foreign Application Priority Data
Jun. 5, 2017 (JP) ................. 2017-110536

(51) Int. Cl.
*G06T 3/40* (2006.01)
*G06T 7/13* (2017.01)

(52) U.S. Cl.
CPC ............ *G06T 3/4023* (2013.01); *G06T 7/13* (2017.01); *G06T 2207/10024* (2013.01); *G06T 2207/20016* (2013.01)

(58) Field of Classification Search
CPC .......... G06T 3/4023; G06T 7/12; G06T 7/13; G06T 7/136; G06T 7/44; G06K 9/00449; G06K 9/00456; G06K 9/00; G06K 9/00442; G06K 9/00463; G06K 9/00469; G06K 9/2054; G06K 9/4604; H04N 19/59
See application file for complete search history.

(56) References Cited

U.S. PATENT DOCUMENTS

| | | | |
|---|---|---|---|
| 7,856,142 B2 * | 12/2010 | Ferman | G06K 9/00456 382/168 |
| 8,009,335 B2 * | 8/2011 | Honda | H04N 1/3878 358/474 |
| 8,064,636 B2 * | 11/2011 | Yokoi | G06K 9/00463 345/698 |
| 8,326,085 B2 * | 12/2012 | Yokoi | G06K 9/3283 382/199 |
| 8,477,390 B2 * | 7/2013 | Iwayama | H04N 1/3878 358/1.12 |

(Continued)

FOREIGN PATENT DOCUMENTS

| JP | H6-4704 | 1/1994 |
|---|---|---|
| JP | 2003-317107 | 11/2003 |

*Primary Examiner* — Michael S Osinski

(57) ABSTRACT

An edge image generating unit detects edge pixels in an original image and generates an edge image that includes the detected edge pixels. A reduction processing unit sets a reduction direction as a horizontal or a vertical direction, and reduces the edge image along the reduction direction by a predetermined reduction ratio without reducing the original image along a direction perpendicular to the reduction direction and thereby generates a reduced image. A connecting pixel group detecting unit detects, in the reduced image, a connecting pixel group continuously extending along the reduction direction. A ruled line determining unit associates two connecting pixel groups with each other as a connecting pixel group pair among the detected connecting pixel groups, and determines a position of a ruled line in the original image from a position of the connecting pixel group pair on the basis of the reduction ratio.

5 Claims, 6 Drawing Sheets

(56) References Cited

U.S. PATENT DOCUMENTS

| | | | | |
|---|---|---|---|---|
| 8,643,649 B2* | 2/2014 | Oto | G06K 9/481 | 345/440 |
| 8,897,574 B2* | 11/2014 | Kawatani | H04N 1/38 | 358/474 |
| 9,035,952 B2* | 5/2015 | Oto | G06K 9/481 | 345/442 |
| 9,275,030 B1* | 3/2016 | Fang | G06F 17/245 | |
| 9,858,512 B2* | 1/2018 | Nanbu | G06K 9/00449 | |
| 10,467,466 B1* | 11/2019 | Cai | G06K 9/00463 | |
| 2002/0159639 A1* | 10/2002 | Shima | G06K 9/00449 | 382/218 |
| 2007/0086643 A1* | 4/2007 | Spier | G06Q 20/04 | 382/137 |
| 2008/0298634 A1* | 12/2008 | Harada | G06F 17/211 | 382/100 |
| 2010/0061638 A1* | 3/2010 | Tanaka | G06T 3/4053 | 382/199 |
| 2010/0208999 A1* | 8/2010 | Oh | G06K 9/342 | 382/195 |
| 2012/0242896 A1* | 9/2012 | Yamagishi | H04N 7/0142 | 348/448 |
| 2012/0288152 A1* | 11/2012 | Yano | G06K 9/6262 | 382/103 |
| 2013/0259385 A1* | 10/2013 | Xie | H04N 1/00681 | 382/199 |
| 2014/0023292 A1* | 1/2014 | Yamada | H04N 5/2628 | 382/289 |
| 2014/0085498 A1* | 3/2014 | Hatano | H04N 9/07 | 348/221.1 |
| 2015/0235080 A1* | 8/2015 | Pan | G06K 9/00442 | 382/112 |
| 2015/0317529 A1* | 11/2015 | Zhou | G06K 9/2054 | 382/190 |
| 2017/0032227 A1* | 2/2017 | Nanbu | G06K 9/00449 | |
| 2017/0124412 A1* | 5/2017 | Long | G06K 9/3283 | |
| 2019/0124225 A1* | 4/2019 | Fujii | H04N 1/00748 | |
| 2019/0220388 A1* | 7/2019 | Sato | G06F 11/3688 | |
| 2019/0294399 A1* | 9/2019 | Yu | G06K 9/00456 | |
| 2019/0355122 A1* | 11/2019 | Zhang | G06K 9/3233 | |

* cited by examiner

FIG. 2

| A | B | C | D |
|---|---|---|---|
| 0 | 5 | 10 | 15 |
| 1 | 6 | 11 | 16 |
| 2 | 7 | 12 | 17 |
| 3 | 8 | 13 | 18 |
| 4 | 9 | 14 | 19 |

FIG. 3

| A | B | C | D | |
|---|---|---|---|---|
| 0 | 5 | 10 | 15 | 41 |
| 1 | 6 | 11 | 16 | |
| 2 | 7 | 12 | 17 | |
| 3 | 8 | 13 | 18 | |
| 4 | 9 | 14 | 19 | |

IMAGE PROCESSING APPARATUS

CROSS-REFERENCE TO RELATED APPLICATIONS

This application relates to and claims priority rights from Japanese Patent Application No. 2017-110536, filed on Jun. 5, 2017, the entire disclosures of which are hereby incorporated by reference herein.

BACKGROUND

1. Field of the Present Disclosure

The present disclosure relates to an image processing apparatus.

2. Description of the Related Art

A ruled line detecting method generates a reduced image from an original image, and detects a connecting component of black pixels in the generated reduced image so that the connecting component corresponds to a ruled line in the original image.

However, in the aforementioned ruled line detecting method, if a solidly filled area (for example, a cell in a table) contacts with a ruled line in a document, the connecting component does not have a thin line shape, and consequently, the connecting component corresponding to a ruled line is not properly detected, so that the ruled line may not detect.

SUMMARY

An image processing apparatus according to an aspect of the present disclosure includes an edge image generating unit, a reduction processing unit, a connecting pixel group detecting unit, and a ruled line determining unit. The edge image generating unit is configured to detect edge pixels in an original image and generate an edge image that includes the detected edge pixels. The reduction processing unit is configured to (a) set a reduction direction as one of a horizontal direction and a vertical direction, and (b) reduce the edge image along the reduction direction by a predetermined reduction ratio without reducing the original image along a direction perpendicular to the reduction direction and thereby generate a reduced image. The connecting pixel group detecting unit is configured to detect a connecting pixel group in the reduced image, the connecting pixel group continuously extending along the reduction direction. The ruled line determining unit is configured to (a) associate two connecting pixel groups with each other as a connecting pixel group pair among connecting pixel groups detected in the reduced image, and (b) determine a position of a ruled line in the original image from a position of the connecting pixel group pair on the basis of the reduction ratio.

These and other objects, features and advantages of the present disclosure will become more apparent upon reading of the following detailed description along with the accompanied drawings.

BRIEF DESCRIPTION OF THE DRAWINGS

FIG. 2 shows a diagram that indicates an example of an original image;

FIG. 3 shows a diagram that indicates an example of an edge image corresponding to the original image shown in FIG. 2;

DETAILED DESCRIPTION

Hereinafter, an embodiment according to an aspect of the present disclosure will be explained with reference to drawings.

Figure 1:
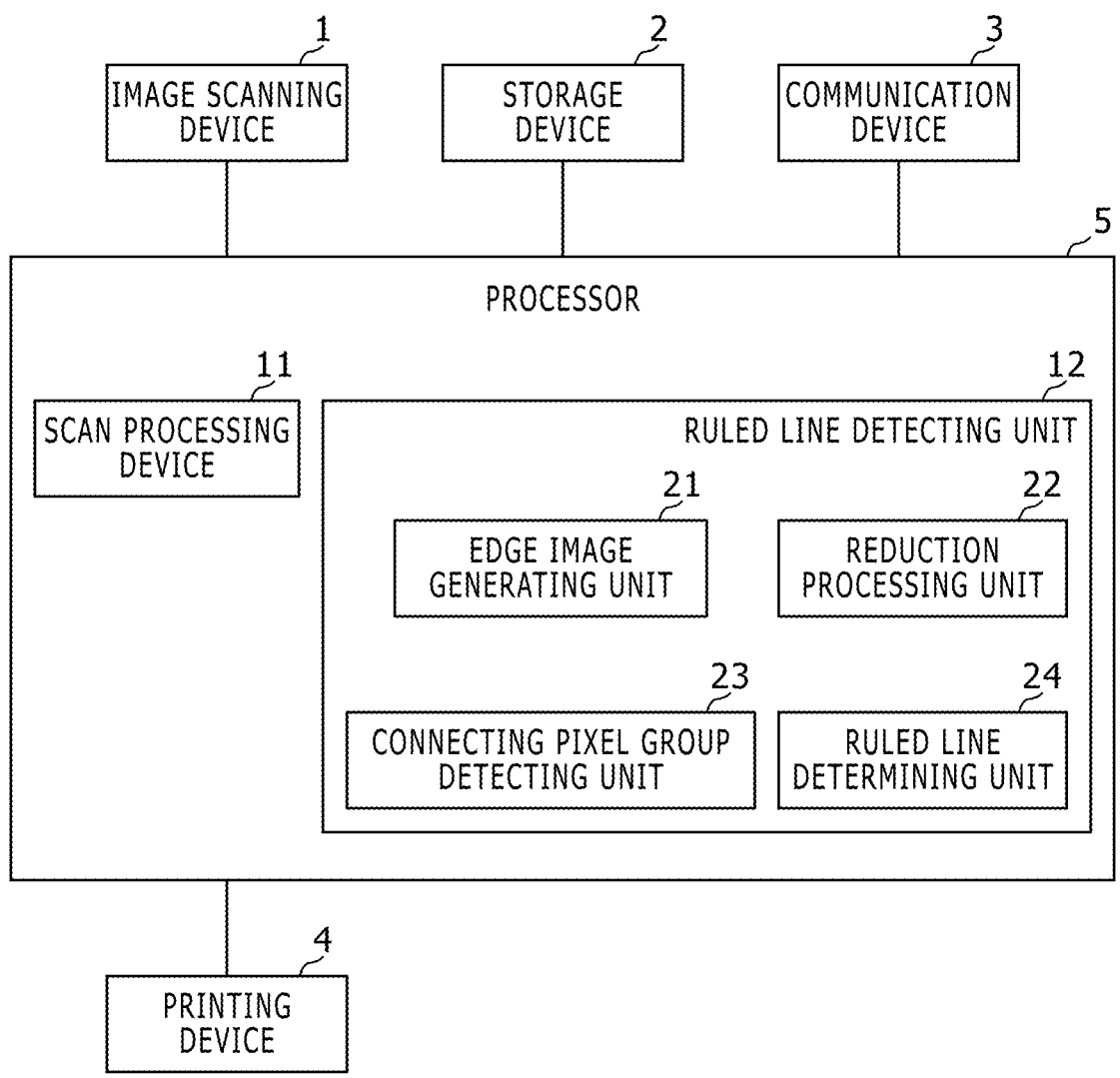
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. The image processing apparatus shown in FIG. 1 is an image forming apparatus such as a copier or a multi function peripheral, and includes an image scanning device 1, a storage device 2, a communication device 3, a printing device 4, and a processor 5.

The image scanning device 1 is an internal device that optically scans a document image of a document, and generates image data (RGB data, here) of the document image.

Further, the storage device 2 is a device capable of storing sorts of data and programs. A non-volatile storage medium with a large capacity is used as the storage device 2, such as non-volatile memory or hard disk drive. The storage device 2 is enabled, for example, to store the image data of the document image.

The communication device 3 is a device which performs data communication with an external device. A network interface that performs network communication, a modem that performs facsimile communication or the like is used as the communication device 3.

The printing device 4 performs printing of a document image based on image data of the document image for which image processing has been processed such as color conversion and halftone process for printing.

The processor 5 is a computer that includes a CPU (Central Processing Unit), a ROM (Read Only Memory), a RAM (Random Access Memory) and the like, loads a program from the ROM or the storage device 2 to the RAM, and executes the program with the CPU and thereby acts as various processing units. In this embodiment, the processor 5 acts as a scan processing unit 11 and a ruled line detecting unit 12.

The scan processing unit 11 controls the image scanning device 1, and thereby obtains a document image and stores image data of the document image in the storage device 2, the RAM, or the like.

The ruled line detecting unit 12 detects a ruled line in the document image (i.e. an original image). Here the ruled line to be detected is a thin line. The ruled line detecting unit 12 includes an edge image generating unit 21, a reduction processing unit 22, a connecting pixel group detecting unit 23, and a ruled line determining unit 24.

Figure 2:
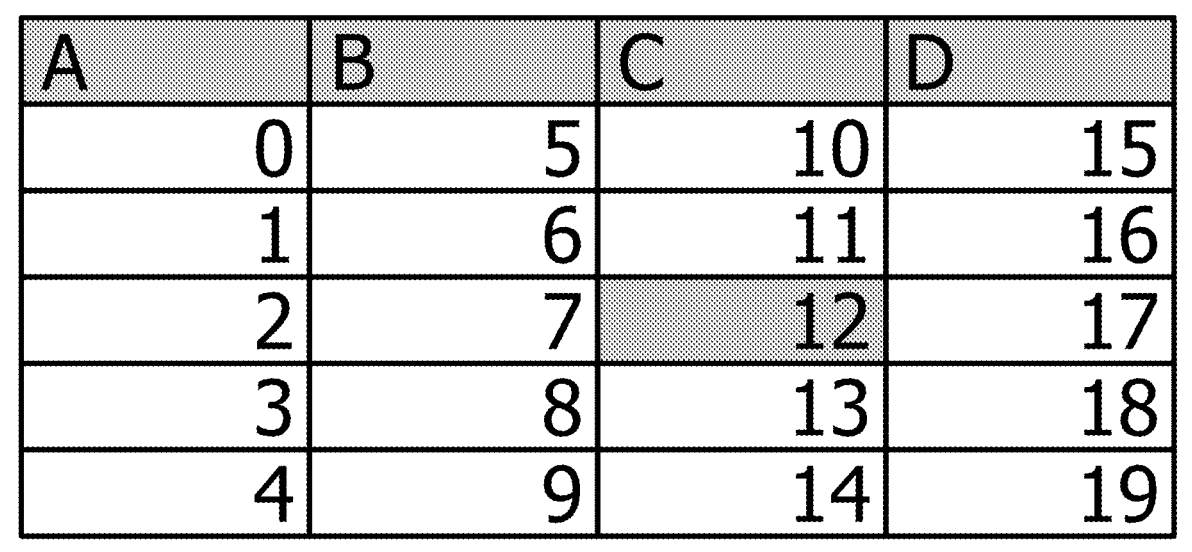

The edge image generating unit 21 detects edge pixels in an original image and generates an edge image that includes the detected edge pixels. FIG. 2 shows a diagram that indicates an example of an original image. FIG. 3 shows a diagram that indicates an example of an edge image corresponding to the original image shown in FIG. 2. In the original image shown in FIG. 2, a background of a cell as a part of cells in a table is solidly filled with a color (a density) different from a color (a density) of a ruled line, and the solidly filled area contacts with the ruled line.

Here, the edge image generating unit 21 searches along a predetermined direction (the horizontal direction or the vertical direction) for an edge (i.e. a location having a density difference larger than a predetermined value) in the original image, and detects as the edge pixel a predetermined number of pixels (e.g. 1 pixel) along the predetermined direction in a high density side of the found edge.

The reduction processing unit 22 (a) sets a reduction direction as one of a horizontal direction (i.e. a primary scanning direction) and a vertical direction (i.e. secondary scanning direction), and (b) reduces an original image along the reduction direction by a predetermined reduction ratio without reducing the original image along a direction perpendicular to the reduction direction and thereby generates a reduced image.

Figure 4:
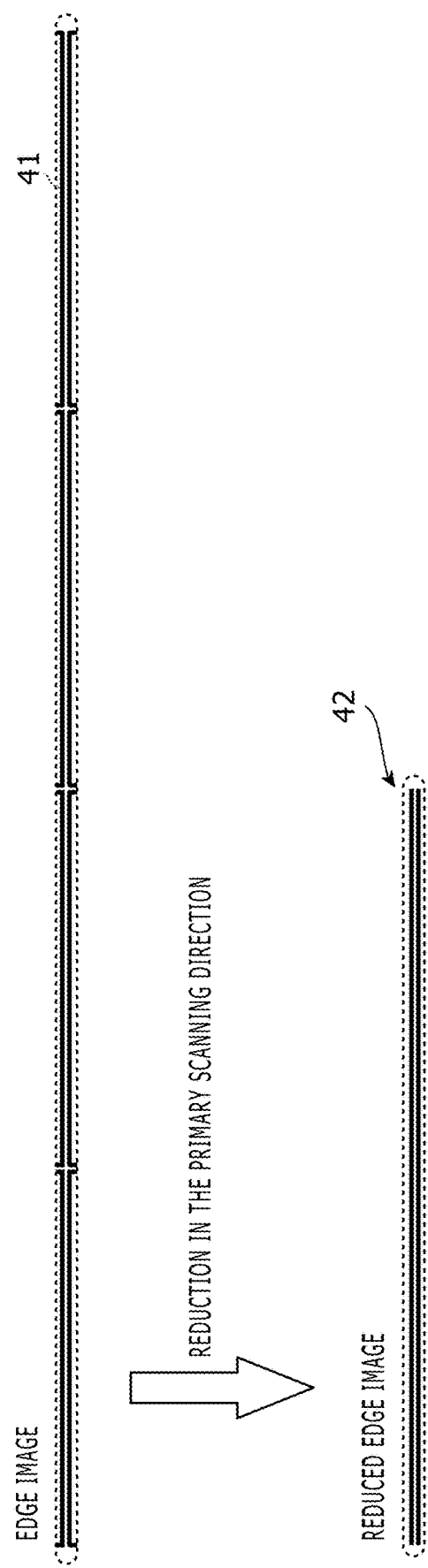
FIG. 4 shows a diagram that indicates an example of an edge image and a reduced edge image.

FIG. 4 shows a diagram that indicates an example of an edge image and a reduced edge image. In FIG. 4, an area 41 is indicated as a part of the edge image shown in FIG. 3.

In this process, the reduction processing unit 22 converts plural pixels in the edge image to one pixel in the reduced image, and sets a pixel value of the one pixel in the reduce image on the basis of pixel values of the plural pixels in the edge image.

For example, if the reduction ratio is ½, then two pixels continuous in the horizontal direction in the edge image is converted to one pixel in the reduced image; and if an average value of pixel values of the two pixels exceeds a predetermined threshold value (e.g. 0.5), then a pixel value of the one pixel in the reduced image is set as 1, and otherwise, if not, then a pixel value of the one pixel in the reduced image is set as 0.

In order to enable to detect a dashed ruled line in the original image, the reduction ratio is set on the basis of a gap between segments in the dashed line. The dashed line includes plural segments with a predetermined gap. The reduction ratio is set as a reciprocal number of a larger number than the number of pixels in the gap between the segments. Consequently, a dashed ruled line to be detected appears as a continuously connecting pixel group in the reduced image.

Further, the aforementioned reduction ratio is set in accordance with the aforementioned "predetermined number" used when detecting the edge pixels. For example, if the aforementioned "predetermined number" is 1, then a connecting pixel group corresponding to one edge has a width of one pixel, and therefore, the reduction ratio is set as ½ and the aforementioned threshold value is set as ½ and thereby a connecting pixel group that extends along a direction perpendicular to the reduction direction in the edge image does not appear in the reduced image; and in the reduction image, a connecting pixel group 42 extending along the reduction direction is not cut and continuously extends at a part in which two ruled line perpendicularly cross each other.

The connecting pixel group detecting unit 23 detects a connecting pixel group that continuously extends along the reduction direction (hereinafter, called "ruled line edge candidate") in the reduced image (i.e. a reduced edge image) generated by the reduction processing unit 22. For example, the connecting pixel group detecting unit 23 detects the connecting pixel group using an existing edge extracting process, a labeling process and the like.

Here the connecting pixel group is plural pixels that (a) have a density (i.e. its pixel value=1) and (b) continue in line.

The ruled line determining unit 24 (a) associates two ruled line edge candidates with each other as a "ruled line edge candidate pair" among ruled line edge candidates detected in the reduced image, and (b) on the basis of the reduction ratio, determines a position (for example, pixel coordinate values of its two ends) of a ruled line in the original image from a position (for example, pixel coordinate values of its two ends of each ruled line edge candidate in the ruled line edge candidate pair) of the ruled line edge candidate pair detected in the aforementioned reduced image. A relationship between a pixel in the original image and a pixel in the reduced image is determined on the basis of the reduction ratio, and therefore on the basis of the reduction ratio, a pixel in the original image corresponding to a pixel in the reduced image is determined.

In this process, for example, the ruled line determining unit 24 associates two ruled line edge candidates between which a distance is equal to or less than a predetermined threshold value, as a ruled line edge candidate pair among ruled line edge candidates detected in the reduced image.

Alternatively, for example, the ruled line determining unit 24, regarding a target ruled line edge candidate among ruled line edge candidates detected in the reduced image, may determine a ruled line edge candidate nearest to the target ruled line edge candidate among two ruled line edge candidates that lie adjacently to one side and the other side of the target ruled line edge candidate in a perpendicular direction of the reduction direction, and may associate the target ruled line edge candidate and the determined ruled line edge candidate as the ruled line edge candidate pair.

In such a case, for example, if the target ruled line edge candidate is a ruled line edge candidate that extends along the horizontal direction, then the ruled line determining unit 24 (a) determines one ruled line edge candidate adjacent in an upper side of the target ruled line edge candidate and one ruled line edge candidate adjacent in an lower side of the target ruled line edge candidate, (b) determines one nearest to the target ruled line edge candidate among these ruled line edge candidates on an upper side and a lower side of the target ruled line edge candidate, and (c) associates the target ruled line edge candidate and the determined ruled line edge candidate with each other as a ruled line edge candidate pair.

Figure 5:
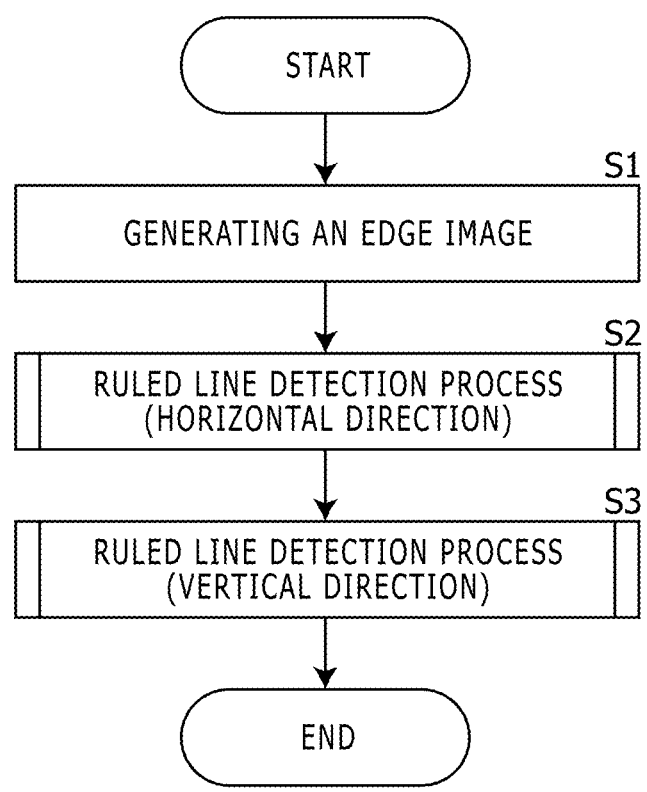
FIG. 5 shows a flowchart that explains a behavior of the image processing apparatus shown in FIG. 1.

The following part explains a behavior of the aforementioned image processing apparatus. FIG. 5 shows a flowchart that explains a behavior of the image processing apparatus shown in FIG. 1.

Firstly, for detecting a ruled line along at least one direction among the horizontal and the vertical directions in an original image, the edge image generating unit 21 generates an edge image from the original image (in Step S1).

Subsequently, the reduction processing unit 22, the connecting pixel group detecting unit 23 and the ruled line determining unit 24 detect a ruled line at least one direction among the horizontal and the vertical directions from the edge image (in Step S2 and S3). If ruled lines should be detected in both directions of the horizontal and the vertical directions, then the detection of a horizontally ruled line and the detection of a vertically ruled line may be performed in any order and may be performed in parallel.

Figure 6:
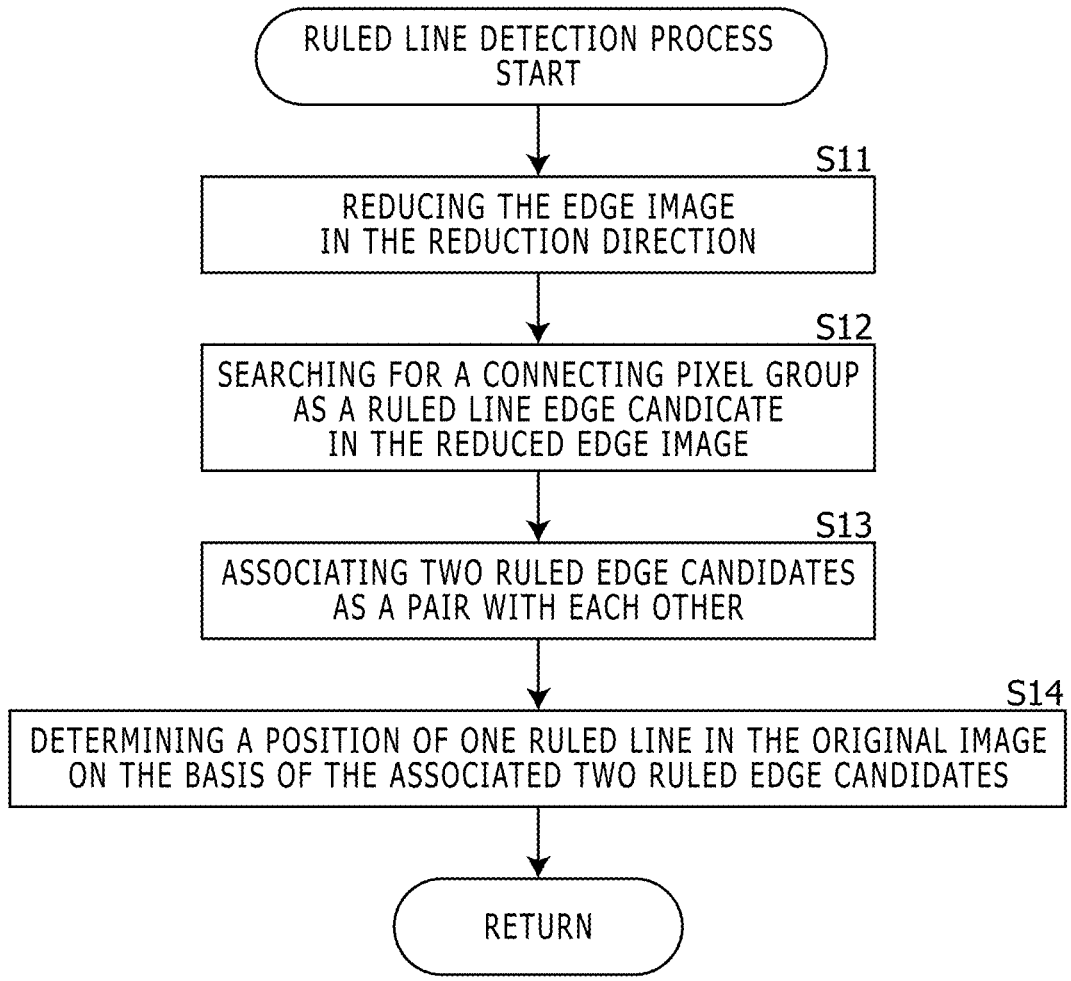
FIG. 6 shows a flowchart that explains details of a ruled line detection process (Step S2 or S3) shown in FIG. 5.

Here a ruled line detection process of the horizontal or the vertical direction (Step S2 or S3) is explained. FIG. 6 shows a flowchart that explains details of the ruled line detection process (Step S2 or S3) shown in FIG. 5.

The reduction processing unit 22 reduces the edge image in the reduction direction (i.e. only in one direction among the horizontal direction and the vertical direction) (in Step S11).

The connecting pixel group detecting unit 23 detects a ruled line edge candidate that extends along the reduction direction in the reduced image (i.e. the reduced edge image) (in Step S12).

Subsequently, the ruled line determining unit 24 determines two ruled line edge candidates as a pair in the reduced image in the aforementioned manner, and associates the two ruled line edge candidates with each other (in Step S13).

Subsequently, the ruled line determining unit 24 determines a position of one ruled line in the original image from positions of the two ruled line edge candidates associated with each other (in Step S14). A ruled line edge candidate that does not form a pair is ignored, and from such a ruled line edge candidate, no ruled lines are determined in the original image.

For example, for detecting a horizontal ruled line in the original image, the reduction processing unit 22 sets the reduction direction as the horizontal direction, and reduces the edge image along the horizontal direction by a predetermined reduction ratio, without reducing the edge image along the vertical direction, and thereby generates a reduced image. The connecting pixel group detecting unit 23 refers to pixel values along the horizontal direction in turn at each pixel position in the vertical direction in the reduced image, and thereby detects as a ruled line edge candidate a connecting pixel group that continuously extends along the horizontal direction, and stores position information of the detected ruled line edge candidate into a memory or the like. Afterward, the ruled line determining unit 24 determines a ruled line edge candidate pair from the detected ruled line edge candidates, and in the original image, determines a position of a horizontal ruled line corresponding to the ruled line edge candidate pair from positions of ruled line edge candidates of the ruled line edge candidate pair. For example, as shown in FIG. 2, if seven horizontal ruled lines lie in the original image, then seven ruled line edge candidate pairs are detected.

Further, for example, for detecting a vertical ruled line in the original image, the reduction processing unit 22 sets the reduction direction as the vertical direction, and reduces the edge image along the vertical direction by a predetermined reduction ratio, without reducing the edge image along the horizontal direction, and thereby generates a reduced image. The connecting pixel group detecting unit 23 refers to pixel values along the vertical direction in turn at each pixel position in the horizontal direction in the reduced image, and thereby detects as a ruled line edge candidate a connecting pixel group that continuously extends along the vertical direction, and stores position information of the detected ruled line edge candidate into a memory or the like. Afterward, the ruled line determining unit 24 determines a ruled line edge candidate pair from the detected ruled line edge candidates, and in the original image, determines a position of a vertical ruled line corresponding to the ruled line edge candidate pair from positions of ruled line edge candidates of the ruled line edge candidate pair. For example, as shown in FIG. 2, if five vertical ruled lines lie in the original image, then five ruled line edge candidate pairs are detected.

As mentioned, in the present embodiment, the edge image generating unit 21 detects edge pixels in an original image and generates an edge image that includes the detected edge pixels. The reduction processing unit 22 (a) sets a reduction direction as one of a horizontal direction and a vertical direction, and (b) reduces the edge image along the reduction direction by a predetermined reduction ratio without reducing the original image along a direction perpendicular to the reduction direction and thereby generates a reduced image. In the reduced image, the connecting pixel group detecting unit 23 detects a connecting pixel group that continuously extends along the reduction direction. The ruled line determining unit 24 (a) associates two connecting pixel groups with each other as a connecting pixel group pair among connecting pixel groups detected in the reduced image, and (b) determines a position of a ruled line in the original image from a position of the connecting pixel group pair on the basis of the reduction ratio.

Consequently, even if a solidly filled area contacts with a ruled line, for example, as shown in FIG. 2, a ruled line in a document image is properly detected.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the ruled line determining unit 24 determines a position of a horizontally ruled line and a position of a vertically ruled line in the original image, and may determine a position of a table in the original image on the basis of the determined position of the horizontally ruled line and the determined position of the vertically ruled line.

Further, in the aforementioned embodiment, the edge image generating unit 21 and/or the reduction processing unit 22 may be embodied using a specific-purpose hardware in order to reduce a required time for the aforementioned process.

Furthermore, in the aforementioned embodiment, if the two ruled line edge candidates have different lengths from each other, then these two ruled line edge candidates may be excluded so as not to form a ruled line edge candidate pair.

What is claimed is:

1. An image processing apparatus, comprising:
    an edge image generating unit configured to detect edge pixels in an original image and generate an edge image that includes the detected edge pixels;
    a reduction processing unit configured to (a) set a reduction direction as one of a horizontal direction and a vertical direction, and (b) reduce the edge image along the reduction direction by a predetermined reduction ratio without reducing the original image along a direction perpendicular to the reduction direction and thereby generate a reduced image;
    a connecting pixel group detecting unit configured to detect a connecting pixel group in the reduced image, the connecting pixel group continuously extending along the reduction direction; and
    a ruled line determining unit configured to (a) associate two connecting pixel groups with each other as a connecting pixel group pair among connecting pixel groups detected in the reduced image, and (b) determine a position of a ruled line in the original image from a position of the connecting pixel group pair on the basis of the reduction ratio.

2. The image processing apparatus according to claim 1, wherein the ruled line determining unit associates two connecting pixel group between which a distance is equal to or less than a predetermined threshold value, as a connecting pixel group pair among connecting pixel groups detected in the reduced image.

3. The image processing apparatus according to claim 1, wherein the ruled line determining unit, regarding a target connecting pixel group among connected pixel groups detected in the reduced image, determines a connecting pixel group nearest to the target connecting pixel group among two connecting pixel groups that lie adjacently to one side and the other side of the target connecting pixel group in a perpendicular direction of the reduction direction, and associates the target connecting pixel group and the determined connecting pixel group as the connecting pixel group pair.

4. The image processing apparatus according to claim 1, wherein the edge image generating unit searches along a predetermined direction for an edge in the original image, and detects as the edge pixel a predetermined number of pixels along the predetermined direction in a high density side of the found edge, and the reduction ratio is set in accordance with the predetermined number.

5. The image processing apparatus according to claim 1, wherein the reduction processing unit (a) sets the reduction direction as the horizontal direction and reduces the original image by the predetermined reduction ratio along the reduction direction and thereby generates a horizontally reduced image, and (b) sets the reduction direction as the vertical direction and reduces the original image by the predetermined reduction ratio along the reduction direction and thereby generates a vertically reduced image;

the connecting pixel group detecting unit (a) detects a horizontally connecting pixel group in the horizontally reduced image, the horizontally connecting pixel group continuously extending along the reduction direction, and (b) detects a vertically connecting pixel group in the vertically reduced image, the vertically connecting pixel group continuously extending along the reduction direction; and the ruled line determining unit (a) associates two horizontally connecting pixel groups with each other as a horizontally connecting pixel group pair among horizontally connecting pixel groups detected in the reduced image and associates two vertically connecting pixel groups with each other as a vertically connecting pixel group pair among vertically connecting pixel groups detected in the reduced image, (b) determines a position of a horizontally ruled line in the original image from a position of the horizontally connecting pixel group pair and determines a position of a vertically ruled line in the original image from a position of the vertically connecting pixel group pair, and (c) determines a position of a table in the original image on the basis of the determined position of the horizontally ruled line and the determined position of the vertically ruled line.

* * * * *